United States Patent [19]
Miyasaki

[11] Patent Number: 5,177,896
[45] Date of Patent: Jan. 12, 1993

[54] SNARE-TYPE TRAP FOR BURROWING ANIMALS

[76] Inventor: Francis S. Miyasaki, 955 Grant St., Vernonia, Oreg. 97064

[21] Appl. No.: 793,174

[22] Filed: Nov. 18, 1991

[51] Int. Cl.$^5$ ............................................. A01M 23/34
[52] U.S. Cl. ............................................. 43/87; 43/86
[58] Field of Search ................ 43/87, 85, 86, 80, 81

[56] References Cited

U.S. PATENT DOCUMENTS

| | | | |
|---|---|---|---|
| 45,399 | 12/1864 | Eddy et al. | 43/86 |
| 690,291 | 12/1901 | Hummell | 43/86 |
| 858,986 | 7/1907 | Johannson | 43/86 |
| 1,016,333 | 2/1912 | Knapp | 43/86 |
| 2,247,066 | 6/1947 | Popp | 43/87 |
| 2,894,352 | 7/1959 | McDonald | 43/87 |
| 5,062,237 | 11/1991 | Kitagawa et al. | 43/86 |

Primary Examiner—Richard K. Seidel
Assistant Examiner—Chuck Y. Mah
Attorney, Agent, or Firm—Eugene M. Eckelman

[57] ABSTRACT

A tubular open-ended body member is arranged to be buried in the ground with opposite ends in alignment with the runway of a burrowing animal. One end of the body member has an international flange of reduced size which supports a running noose of line and an elastic carrier for this running noose. A trigger hangs in the body member and is associated with the flange so that when an animal engages the trigger, it will dislodge the elastic band and the running noose from the flange and engage them around the animal's body. The running noose is on a line having an anchor end engagable with the body member to cinch the running noose tightly around the animal, and hold the animal in a trapped position.

4 Claims, 1 Drawing Sheet

U.S. Patent    Jan. 12, 1993    5,177,896
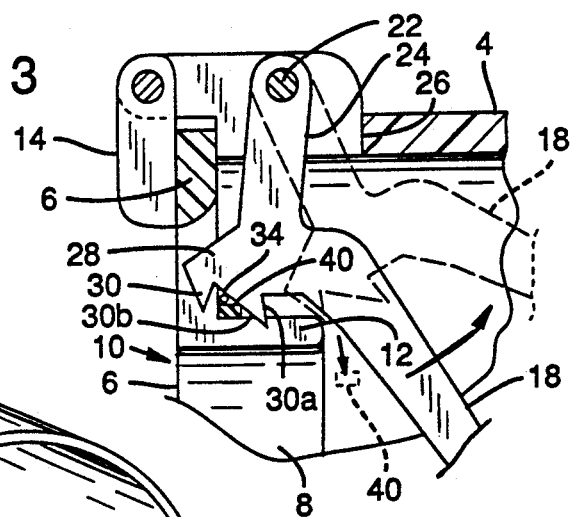
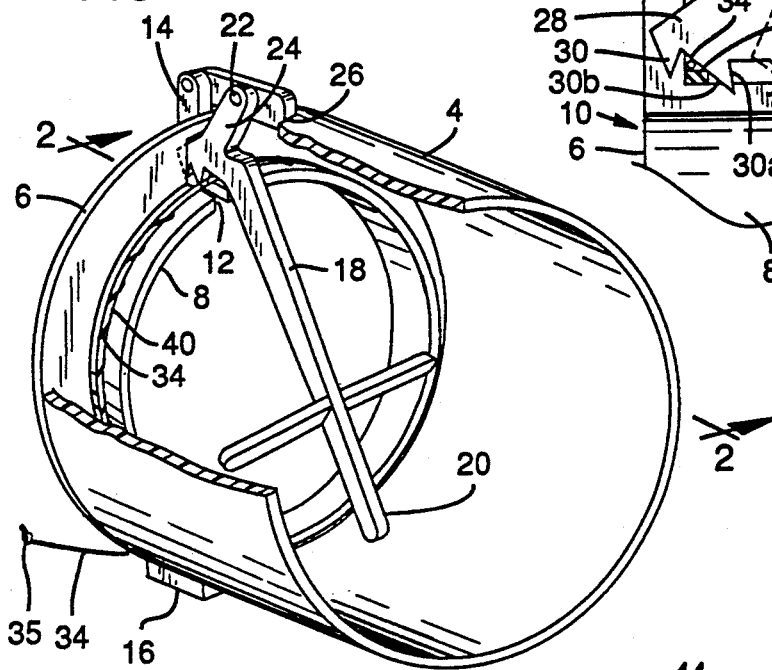
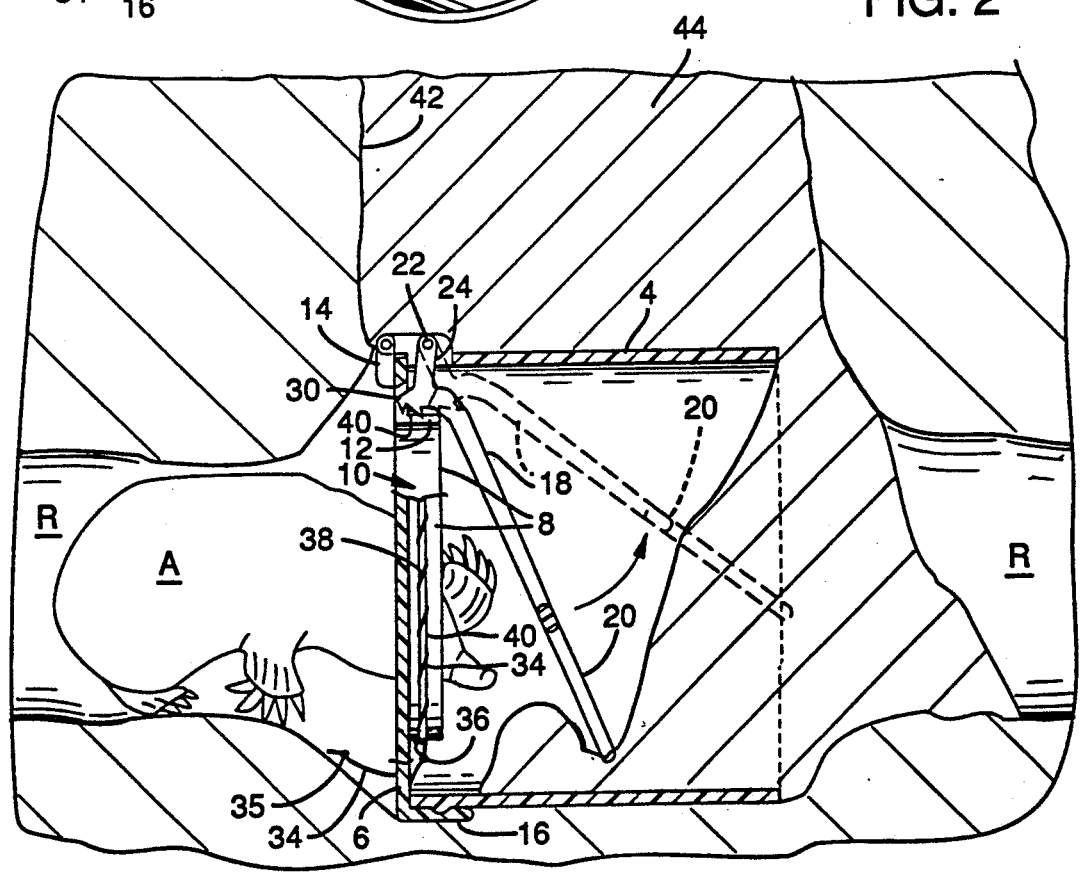

SNARE-TYPE TRAP FOR BURROWING ANIMALS

BACKGROUND OF THE INVENTION

Various means have heretofore been employed to trap burrowing animals such as moles and gophers. For example, existing traps are partially or entirely buried in the ground and have metal jaws or cinch means that clamp around the animal. Also, gas bombs have been used. These types of eradicating means have disadvantages, one such disadvantage being that they are dangerous to children, pets, or persons who unknowingly or without authorization or proper skill come into contact with them. The clamp type trap is also frightening to set.

SUMMARY OF THE INVENTION

According to the present invention and forming a primary objective thereof, a trap for burrowing animals is provided that is efficient in use and is also safe for personnel operating it, pets, and personnel who may unknowingly or without authorization come into contact with it.

A further object is to provide a trap of the type described that is inexpensive to manufacture and simple to use.

In carrying out the objectives of the invention, such invention comprises a tubular open-ended body member arranged to be buried in the ground with opposite first and second open end portions in alignment with the runway of the burrowing animal. A running noose of line is supported at the first open end in encircling relation and has an end portion that is anchored to the body member. The body member includes trigger means engageable by the burrowing animal that dislodges the running noose for its snaring engagement of the animal. Preferably, the running noose is associated with an elastic carrier therefor that initially engages and binds around the animal and holds the running noose in place until the latter is tightened due to movement of the animal away from the anchored end portion of the line.

The invention will be better understood and additional objects and advantages will become apparent from the following description taken in connection with the accompanying drawings.

BRIEF DESCRIPTION OF THE DRAWINGS

FIG. 1 is a perspective view of the present trap.

FIG. 2 is a sectional view taken on the line 2—2 of FIG. 1 and showing the trap in set position in a burrowing animal runway, and FIG. 3 is an enlarged fragmentary elevational view of a portion of the trigger means.

DETAILED DESCRIPTION OF A PREFERRED EMBODIMENT

The present trap is designed to lasso or snare burrowing animals such as moles or gophers. With particular reference to the drawings, the invention comprises a tubular open ended body member 4 having an internal or runway diameter larger than the diameter of the usual runway R of a burrowing animal A, FIG. 2. The body member 4 supports an outer ring-shaped end wall 6 having an inturned flange 8. The inturned flange 8 defines an inlet opening 10 which is of a diameter large enough to allow the burrowing animal to move freely therethrough and into the body member 4 but of a diameter smaller than the internal diameter of the body member to form a space between the flange and the internal surface of the body member. An upper portion of the flange 8 has a slot 12 extending in the longitudinal direction of the body member. Wall 6 is pivotally connected to the body member 4 by hinge means 14 at one point on the body member and has a releasable latch connection 16 with the body member at an opposite point whereby the wall can be swung open or latched shut.

A lever 18 with a cross-like free end portion 20 is pivotally supported at an upper portion of the body member and extends downwardly, and rearwardly to a point just short of the bottom of the body member. Pivotal support of the lever at the top of the body member may be by any suitable means, such as by a cross pivot pin 22 secured to the outer surface of the body member and supporting the lever for pivotal movement by an ear 24 extending through an opening 26 in the body member and supported on the pin 22. The ear 24 has a forward extension 28 with bottom teeth 30 aligned with the slot 12 in the flange 8 and extending down at least to the top of the slot 12. The teeth have a straight edge 30a that faces the outlet or right-hand end of the body member and an inclined edge 30b facing the inlet or left-hand end, for a purpose to be described.

The body member 4 is used with a snare line 34 having a slip knot 36 arranged to form a running noose 38. The running noose portion 38 of the line 34 carries an elastic band 40 of a size that is arranged to be stretched onto the flange 8 to hold the running noose in a set trap position and also to tightly engage the body of a burrowing animal in a release position, now to be described.

To set the trap, the end wall 6 is swung open, and with the lever 18 pivoted upwardly so that the teeth 30 are displaced from the flange 8, the running noose portion 38 and its carrier elastic band 40 are mounted on the flange 8. The elastic band holds the running noose portion firmly in place on the flange 8. The lever 18 can then be released whereby the angled portion 30b of one or more of the teeth 30 rides over the running noose portion and the elastic band. Thereupon, the free end of the cinch line, comprising a knot end 35, is held outside the body member and the wall 6 closed and snapped into place. Although the line will slide through the joint between the wall 6 and the body member 4, the knot 35 cannot slide therethrough and thus serves as a stop or anchor for further sliding movement.

In operation, a hole 42 is dug to the runway R in the ground, FIG. 2, and slightly therebelow, and the trap set in place with the two end portions of the body member aligned longitudinally with the runway. Hole 42 is then closed with fill dirt 44 which will lock the trap in place. Some of the fill dirt will fall around and into the trap but such will not interfere with operation of the trap. If the direction of travel of the animal is not known, two traps can be set facing in opposite directions.

When a burrowing animal progresses through the runway and comes to the lever 18, it attempts to dislodge the obstruction. The cross-type end portion 20 will show dirt and will encourage the animal to plow through. The strength of the animal pivots the lever upwardly, including any dirt in front of the lever, namely, to the broken line position shown in FIG. 2. About the time that the animal starts to nose beyond the bottom edge of the lever, the teeth 30 of the lever dislodge the running noose 38 and the elastic band from the flange 8. Since the body of the animal will be in the area of the flange 8, the elastic band will snap around its body, carrying the running noose with it. The animal then continues to travel with the noose securely held on its body by the elastic band and will do so until the knot 35 of the line 34 engages the body member of the trap and stops the line. Further movement of the animal cinches the noose down tightly and holds the animal in a trapped stationary position.

It is to be understood that the form of my invention herein shown and described is to be taken as a preferred example of the same and that various changes in the shape, size and arrangement of parts may be resorted to without departing from the spirit of my invention, or the scope of the subjoined claims.

Having thus described my invention, I claim:

1. A snare-type trap for burrowing animals comprising:

a tubular body member with an interior runway surface and with opposite first and second open end portions, said first open end portion comprising an entrance end for an animal and having an opening of less size than said interior runway surface, said body member being capable of being buried in the ground with said opposite first and second open end portions in alignment with a runway of a burrowing animal, an annular flange defining said opening, said flange extending interiorly of said body toward said second open end portion and having a peripheral surface spaced form the interior runway surface of said body member, a running noose of line encircling the peripheral surface of said flange and having an anchored end portion, trigger means in said body member engageable by a burrowing animal, noose engaging means on said trigger means capable of dislodging said running noose from said flange interiorly of said body member, and an elastic loop carrier mounted on said running noose, said elastic loop carrier being capable of being dislodged with said running noose by said trigger means and being capable of engaging and binding around an animal entering the body member to hold said running noose in place on the animal until the running noose is tightened by movement of the animal away from said anchored end portion of said running noose.

2. The trap of claim 1 wherein said trigger means comprises a lever pivotally supported on said body and including an extension associated with the said flange to dislodge said running noose of line and said elastic loop carrier from said flange when an animal engages and pivots said trigger means.

3. The trap of claim 2 wherein said flange includes a slot which is spanned by said running noose and elastic loop carrier when said noose and carrier are mounted on said flange, said extension on said trigger means having tooth portions associated with said slot capable of riding over said noose and carrier to set the trap but engaging and dislodging said noose and carrier from said flange when said trigger means is engaged by a burrowing animal.

4. The trap of claim 1 wherein said trigger means comprises a cross end portion capable of showing dirt to the animal beyond said trigger means.

* * * * *